United States Patent
Washizuka

(10) Patent No.: US 9,640,832 B2
(45) Date of Patent: May 2, 2017

(54) NON-AQUEOUS ELECTROLYTE SECONDARY BATTERY

(71) Applicant: MURATA MANUFACTURING CO., LTD., Nagaokakyo-shi, Kyoto-Fu (JP)

(72) Inventor: Seitaro Washizuka, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 28 days.

(21) Appl. No.: 13/947,195

(22) Filed: Jul. 22, 2013

(65) Prior Publication Data

US 2013/0302700 A1   Nov. 14, 2013

Related U.S. Application Data

(63) Continuation of application No. PCT/JP2012/051411, filed on Jan. 24, 2012.

(30) Foreign Application Priority Data

Jan. 25, 2011   (JP) .................................. 2011-012684

(51) Int. Cl.
*H01M 4/13*       (2010.01)
*H01M 10/052*     (2010.01)
*H01M 10/0525*    (2010.01)
*H01M 10/0567*    (2010.01)

(52) U.S. Cl.
CPC ..... *H01M 10/052* (2013.01); *H01M 10/0525* (2013.01); *H01M 10/0567* (2013.01); *H01M 2300/0034* (2013.01)

(58) Field of Classification Search
CPC ..................................................... H01M 10/05
See application file for complete search history.

(56) References Cited

U.S. PATENT DOCUMENTS

| | | |
|---|---|---|
| 2004/0106047 A1 | 6/2004 | Mie et al. |
| 2006/0134528 A1 | 6/2006 | Ihara et al. |
| 2008/0138715 A1 | 6/2008 | Ihara et al. |
| 2010/0075233 A1 | 3/2010 | Yamaguchi et al. |

(Continued)

FOREIGN PATENT DOCUMENTS

| | | |
|---|---|---|
| CN | 1497765 A | 5/2004 |
| CN | 101197456 A | 6/2008 |

(Continued)

OTHER PUBLICATIONS

PCT/JP2012/051411 Written Opinion dated Mar. 13, 2012.

*Primary Examiner* — Jacob Marks
(74) *Attorney, Agent, or Firm* — Arent Fox LLP

(57) ABSTRACT

A non-aqueous electrolyte secondary battery that has a battery element including a positive electrode member, a negative electrode member, and a non-aqueous electrolyte solution. The negative electrode member contains graphitizable carbon. With respect to 100 parts by weight of the non-aqueous electrolyte solution, fluoroethylenecarbonate is added at 0.5 parts by weight or more and 1.0 parts by weight or less, and lithium difluorobis(oxalato)phosphate is added at 0.5 parts by weight or more and 1.0 parts by weight or less, or fluoroethylenecarbonate and lithium difluorobis(oxalato)phosphate are added at 0.5 parts by weight or more and 2.0 parts by weight or less in total.

20 Claims, 2 Drawing Sheets

(56) References Cited

U.S. PATENT DOCUMENTS

| | | | |
|---|---|---|---|
| 2010/0285366 A1* | 11/2010 | Endoh | H01M 4/13 |
| | | | 429/231.95 |
| 2010/0310943 A1 | 12/2010 | Koh et al. | |
| 2011/0111288 A1* | 5/2011 | Nishida et al. | 429/199 |
| 2013/0022861 A1 | 1/2013 | Miyagi et al. | |

FOREIGN PATENT DOCUMENTS

| | | |
|---|---|---|
| EP | 1 939 971 A1 | 7/2008 |
| JP | 2004-039651 A | 2/2004 |
| JP | 2006-190635 A | 7/2006 |
| JP | 2008-016422 A | 1/2008 |
| JP | 2009-206072 A | 9/2009 |
| WO | WO 2010/064637 A1 | 6/2010 |

* cited by examiner

NON-AQUEOUS ELECTROLYTE SECONDARY BATTERY

CROSS REFERENCE TO RELATED APPLICATIONS

The present application is a continuation of International application No. PCT/JP2012/051411, filed Jan. 24, 2012, which claims priority to Japanese Patent Application No. 2011-012684, filed Jan. 25, 2011, the entire contents of each of which are incorporated herein by reference.

FIELD OF THE INVENTION

The present invention generally relates to a non-aqueous electrolyte secondary battery, and more particularly relates to a non-aqueous electrolyte secondary battery that has improved low-temperature input/output characteristics.

BACKGROUND OF THE INVENTION

Conventionally, for non-aqueous electrolyte secondary batteries, typically, a non-aqueous electrolyte solution is used which has, for example, a lithium salt such as lithium hexafluorophosphate dissolved as an electrolyte salt in a non-aqueous solvent such as ethylene carbonate or dimethyl carbonate, a lithium-transition metal composite oxide is used as a positive electrode active material, and a carbon material is used as a negative electrode active material. In addition, the use of two or more non-aqueous solvents in the form of a mixture has been proposed in these non-aqueous electrolyte secondary batteries.

For example, Japanese Patent Application Laid-Open No. 2009-206072 (hereinafter, referred to as Patent Document 1) proposes a solvent for dissolving an electrolyte salt in a lithium secondary battery, which contains at least one fluorine-based solvent selected from the group consisting of fluorine-containing ether, fluorine-containing ester, and fluorine-containing chain carbonate, and contains 1,2-dialkyl-1,2-difluoroethylenecarbonate. In addition, Patent Document 1 discloses the action of providing flame-retardant electrolyte solutions, and further effects such as improvements in battery rate characteristics, which are achieved by the use of the solvent mentioned above.

Patent Document 1: Japanese Patent Application Laid-Open No. 2009-206072

SUMMARY OF THE INVENTION

However, as a result of studies carried out on various electrolyte solutions containing a fluorine-containing solvent as proposed in Patent Document 1, it has been found that just using an electrolyte solution containing a fluorine-containing solvent is insufficient for improving battery characteristics at low temperatures. In particular, it has been found that the electrical conductivity of the electrolyte solution is decreased to increase the internal resistance of the cell at low temperatures. For this reason, the battery undergoes a decrease in input/output characteristics at low temperatures. The present invention has been achieved in order to solve the problem mentioned above.

Therefore, an object of the present invention is to provide a non-aqueous electrolyte secondary battery that is capable of improving low-temperature input/output characteristics.

A non-aqueous electrolyte secondary battery according to an aspect of the present invention includes a positive electrode, a negative electrode, and a non-aqueous electrolyte solution. The negative electrode contains graphitizable carbon. With respect to 100 parts by weight of the non-aqueous electrolyte solution, fluoroethylenecarbonate is added at 0.5 parts by weight or more and 1.0 parts by weight or less, and lithium difluorobis(oxalato)phosphate is added at 0.5 parts by weight or more and 1.0 parts by weight or less.

A non-aqueous electrolyte secondary battery according to another aspect of the present invention includes a positive electrode, a negative electrode, and a non-aqueous electrolyte solution. The negative electrode contains graphitizable carbon. With respect to 100 parts by weight of the non-aqueous electrolyte solution, fluoroethylenecarbonate and lithium difluorobis(oxalato)phosphate are added at 0.5 parts by weight or more and 2.0 parts by weight or less in total.

The non-aqueous electrolyte according to the present invention can reduce the direct-current resistance (DCR) at low temperatures, because the specific amounts of fluoroethylenecarbonate and lithium difluorobis(oxalato)phosphate are added to the non-aqueous electrolyte solution. Thus, the input/output characteristics of the non-aqueous electrolyte secondary battery can be improved at low temperatures.

DETAILED DESCRIPTION OF THE INVENTION

Figure 1:
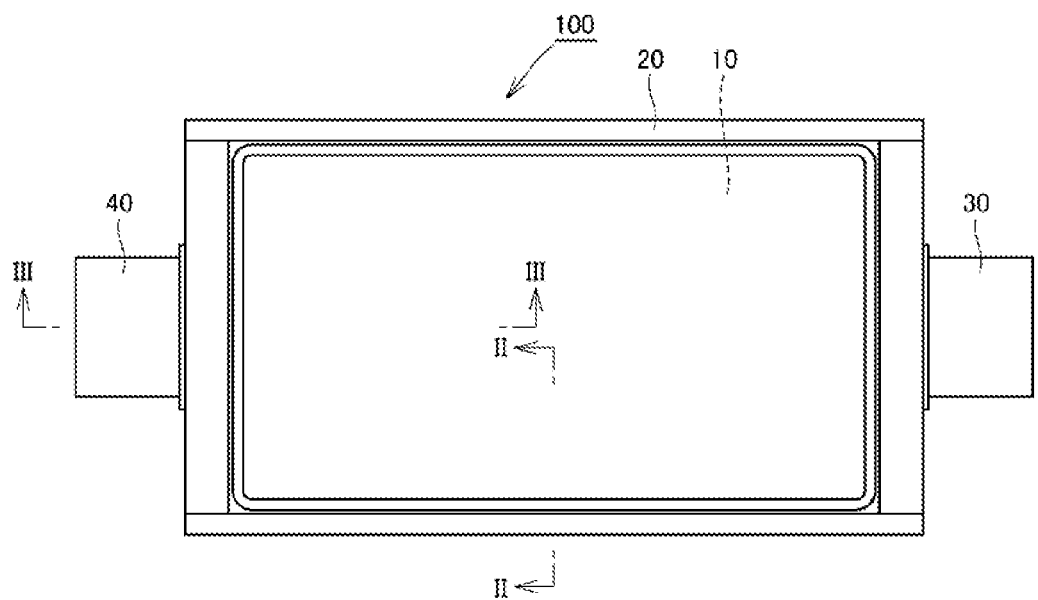
FIG. 1 is a plane view illustrating the appearance of a non-aqueous electrolyte secondary battery prepared according to Examples of the present invention.

The inventors of the present invention have carried out various studies on configurations capable of reducing the direct-current resistance at low temperatures when an electrolyte solution containing a fluorine-containing solvent is used. As a result, it has been found that a non-aqueous electrolyte secondary battery according to the present invention can reduce the direct-current resistance at low temperatures, as long as the non-aqueous electrolyte secondary battery including a positive electrode, a negative electrode, and a non-aqueous electrolyte solution has the following features. The present invention has been achieved based on this finding obtained by the inventors.

In the non-aqueous electrolyte secondary battery according to the present invention, the negative electrode contains graphitizable carbon, and with respect to 100 parts by weight of the non-aqueous electrolyte solution, fluoroethylenecarbonate is added at 0.5 parts by weight or more and 1.0 parts by weight or less, and lithium difluorobis(oxalato)phosphate is added at 0.5 parts by weight or more and 1.0 parts by weight or less, or fluoroethylenecarbonate and lithium difluorobis(oxalato)phosphate are added at 0.5 parts by weight or more and 2.0 parts by weight or less in total.

As described above, the addition of the specific amounts of fluoroethylenecarbonate and lithium difluorobis(oxalato)phosphate to the non-aqueous electrolyte solution can reduce the direct-current resistance (DCR) at low temperatures. Thus, the input/output characteristics of the non-aqueous electrolyte secondary battery can be improved at low temperatures.

In addition, the addition of fluoroethylenecarbonate and lithium difluorobis(oxalato)phosphate to the non-aqueous electrolyte solution is supposed to produce specific interactions between the additives and the solvent so that the surface tension of the non-aqueous electrolyte solution can be decreased. For this reason, the wettability of the non-aqueous electrolyte solution is improved with respect to the surfaces of the electrodes.

Furthermore, the non-aqueous electrolyte solution penetrates even into the negative electrode, because the negative electrode contains graphitizable carbon (soft carbon). Thus, the reactive area will be increased at the interface between the non-aqueous electrolyte solution and the negative electrode. Therefore, the number of active sites for the reaction is increased to make it possible to reduce the interfacial resistance. Further, the negative electrode containing graphitizable carbon also makes it possible to lower the resistance, so that the output characteristics can be improved.

In one embodiment of the present invention, the non-aqueous electrolyte secondary battery includes a non-aqueous electrolyte solution of an electrolyte salt dissolved in a non-aqueous solvent, a positive electrode, and a negative electrode.

A lower chain carbonate as a low-viscosity solvent, such as dimethyl carbonate (DMC), ethylmethyl carbonate (EMC), or diethyl carbonate (DEC), which is added to a cyclic carbonate such as ethylene carbonate (EC) or propylene carbonate (PC), is used as the non-aqueous solvent.

In addition, as the electrolyte salt, $LiPF_6$, $LiAsF_6$, $LiBF_4$, $LiClO_4$, $LiCF_3SO_3$, $LiC(SO_2CF_3)_3$, $LiN(SO_2C_2F_5)_2$, $LiN(SO_2CF_3)_2$, $LiAlCl_4$, $LiSiF_6$, etc. can be used singly, or two or more thereof can be used in combination. Among these salts, it is desirable to use, in particular, $LiPF_6$ or $LiBF_4$ as the electrolyte salts in terms of oxidation stability. This electrolyte salt is preferably dissolved at a concentration of 0.1 mol/L to 3.0 mol/L in a non-aqueous solvent, and used, and further preferably dissolved at a concentration of 0.5 mol/L to 2.0 mol/L therein, and used. For example, $LiPF_6$ is used which is dissolved at a concentration of 1.0 mol/L in a non-aqueous solvent.

In one embodiment of the present invention, the positive electrode and negative electrode of the non-aqueous electrolyte secondary battery are alternately stacked and arranged with a separator interposed therebetween. The structure of the battery element may be composed of a stacked body of: a plurality of strip-shaped positive electrodes; a plurality of strip-shaped separators; and a plurality of strip-shaped negative electrodes, that is, a stacked body that has a so-called sheet-to-sheet structure, or may be composed of an elongated separator in a zigzag form with strip-shaped positive electrodes and strip-shaped negative electrodes interposed alternately. Alternatively, a wound structure obtained by winding an elongated positive electrode, an elongated separator, and an elongated negative electrode may be adopted as the structure of the battery element. In Examples below, a stacked body of a sheet-to-sheet structure is adopted as the structure of the battery element.

The positive electrode has a positive electrode mixture layer containing a positive electrode active material, a conducting agent, and a binder, which is formed on both sides of a positive electrode current collector. As an example, the positive electrode current collector is composed of aluminum. A lithium-cobalt composite oxide, a lithium-manganese composite oxide, a lithium-nickel composite oxide, a lithium-nickel-manganese-cobalt composite oxide, a lithium-manganese-nickel composite oxide, a lithium-manganese-cobalt composite oxide, a lithium-nickel-cobalt composite oxide, etc. can be used for the positive electrode active material. Moreover, the positive electrode active material may be a mixture of the materials mentioned above. The positive electrode active material may be an olivine material such as $LiFePO_4$. Carbon or the like is used as the conducting agent in the positive electrode. Polyvinylidene fluoride (PVDF) or polyamideimide (PAI) is used as the binder for binding the positive electrode active material and the conducting agent.

On the other hand, the negative electrode has a negative electrode mixture layer containing a negative electrode active material and a binder, which is formed on both sides of a negative electrode current collector. As an example, the negative electrode current collector is composed of aluminum or copper, and the negative electrode active material is composed of graphitizable carbon (soft carbon). Polyvinylidene fluoride or polyamideimide is used as the binder for binding the negative electrode active material.

The separator should not be particularly limited, for which conventionally known separators can be used. It is to be noted that the separator should not be limited by its name in the present invention, and such a solid electrolyte or gel electrolyte that has a function (role) as a separator may be used in place of the separator. In addition, a separator may be used which contains an inorganic material such as alumina or zirconia. For example, a porous film containing polypropylene and/or polyethylene is used as the separator.

Next, Examples of the present invention will be specifically described. It is to be noted that the Example below is one example, and the present invention should not be limited by the Examples below.

EXAMPLES

Non-aqueous electrolyte secondary batteries according to Examples and Comparative Examples were prepared by varying the additive amounts of fluoroethylenecarbonate and lithium difluorobis(oxalato)phosphate to a non-aqueous electrolyte solution, with the use of a positive electrode, a negative electrode, and a non-aqueous electrolyte solution prepared in the following way.

Example 1

(Preparation of Positive Electrode)

A lithium-nickel-manganese-cobalt composite oxide represented by the composition formula of $LiNi_{0.33}Mn_{0.33}Co_{0.33}O_2$ as a positive electrode active material, a carbon powder as a conducting agent, and polyvinylidene fluoride as a binder were blended for 88:6:6 in terms of ratio by mass, and kneaded with N-methyl-2-pyrrolidone to prepare positive electrode mixture slurry. This positive electrode mixture slurry was applied onto both sides of aluminum foil as a positive electrode current collector so that the quantity of dried positive electrode mixture was 23.1 mg/cm$^2$ per unit area of one side, and dried by heating to a temperature of 130° C. The obtained positive electrode material was rolled by roll press, and the rolled positive electrode material was cut to prepare strip-shaped positive electrode members.

(Preparation of Negative Electrode)

Soft carbon as a negative electrode active material and polyvinylidene fluoride as a binder were blended for 90:10 in terms of ratio by mass, and kneaded with N-methyl-2-pyrrolidone to prepare negative electrode mixture slurry. This negative electrode mixture slurry was applied onto both sides of copper foil as a negative electrode current collector so that the quantity of dried negative electrode mixture was 15.3 mg/cm$^2$ per unit area of one side, and dried by heating to a temperature of 130° C. The obtained negative electrode material was rolled by roll press, and the rolled negative electrode material was cut to prepare strip-shaped negative electrode members.

(Preparation of Non-Aqueous Electrolyte Solution)

With the use of, as a non-aqueous solvent, a mixed solvent of ethylene carbonate, ethylmethyl carbonate, and dimethyl carbonate mixed at 1:1:1 in terms of ratio by volume, LiPF$_6$ as an electrolyte salt was dissolved in the mixed solvent for a concentration of 1 mol/L to prepare a non-aqueous electrolyte solution.

With respect to 100 parts by weight of the non-aqueous electrolyte solution, 0.5 parts by weight of lithium difluorobis(oxalato)phosphate and 0.5 parts by weight of fluoroethylenecarbonate were added.

(Preparation of Battery)

Figure 2:
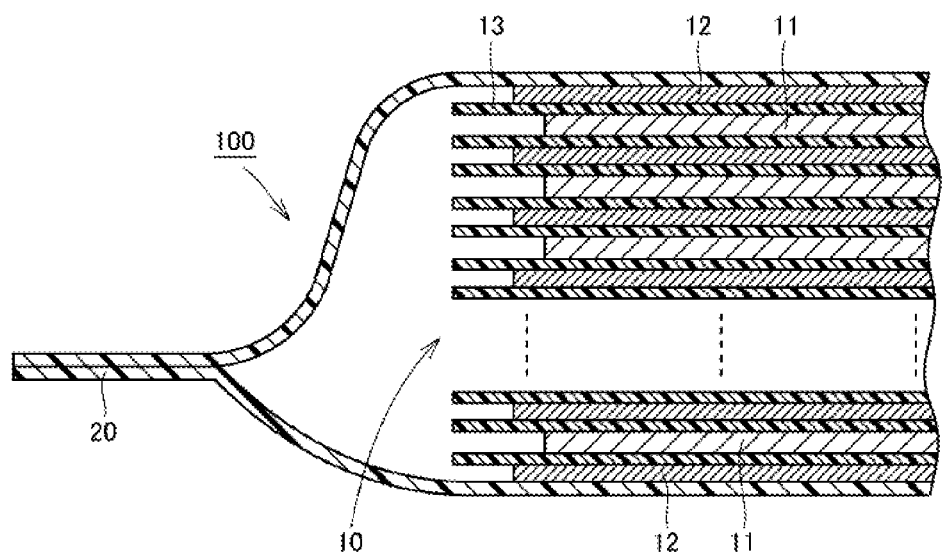
FIG. 2 is a partial cross-sectional view schematically illustrating the configuration of a battery element housed in an outer packaging material of the non-aqueous electrolyte secondary battery shown in FIG. 1, and showing an enlarged cross section viewed from a direction along the line II-II of FIG. 1.
Figure 3:
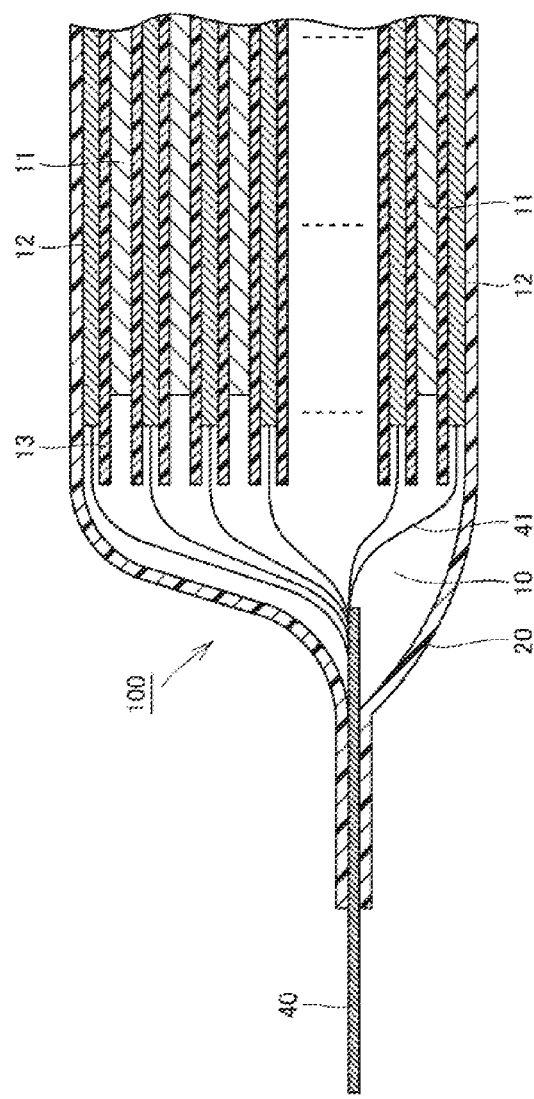
FIG. 3 is a partial cross-sectional view schematically illustrating the configuration of the battery element housed in the outer packaging material of the non-aqueous electrolyte secondary battery shown in FIG. 1, and showing an enlarged cross section viewed from a direction along the line III-III of FIG. 1.

As shown in FIGS. 2 and 3, many strip-shaped separators 13 composed of lithium-ion permeable porous films of polypropylene and polyethylene were interposed alternately between the many strip-shaped positive electrode members 11 and negative electrode members 12 prepared above to prepare a battery element (power generation element) 10. As shown in FIG. 1, the battery element 10 was housed in an outer packaging material 20 composed of a laminate film including aluminum as an intermediate layer. In order to extend from the inside of the outer packaging material 20 to the outside, a positive electrode terminal 30 is attached to the positive electrode current collector with the many positive electrode members 11 exposed, whereas a negative electrode terminal 40 is attached to the negative electrode current collector 41 with the many negative electrode members 12 exposed as shown in FIG. 3. Specifically, the surface of the positive electrode current collector was partially exposed by peeling away the positive electrode mixture layer located at one end of the strip-shaped positive electrode member 11. This partially exposed surface of the positive electrode current collector was subjected to ultrasonic welding with an aluminum tab as the positive electrode terminal 30 to prepare a positive electrode. The surface of the negative electrode current collector 41 (FIG. 3) was partially exposed by peeling away the negative electrode mixture layer located at one end of the strip-shaped negative electrode member 12. This partially exposed surface of the negative electrode current collector 41 was subjected to ultrasonic welding with a copper tab as the negative electrode terminal 40 to prepare a negative electrode. Then, after injecting the non-aqueous electrolyte solution prepared above into the outer packaging material 20, an opening of the outer packaging material 20 was subjected to sealing to prepare a non-aqueous electrolyte secondary battery 100 according to Example 1.

(Measurement of Capacity)

Constant-voltage charge was carried out by, with a current value of 1 C regarded as 3 A, charging up to a voltage of 4.2 V with a current value of 0.2 C at a temperature of 25° C., and then further reducing the charging current down to a current value of 0.02 C while maintaining the voltage at 4.2 V. Then, after a pause for 10 minutes, discharge was carried out down to a voltage of 2.5 V with a current value of 0.2 C to measure the discharging capacity. The discharging capacity was 3.0 to 3.1 Ah.

(Measurement of Open Circuit Voltage—State of Charge]

The voltage was adjusted by discharging down to a voltage of 2.5 V with a current value of 0.2 C in advance at a temperature of 25° C. Then, constant-voltage charge was carried out by charging up to a voltage of 2.84 V with a current value of 0.2 C, and reducing the charging current down to a current value of 0.02 C while maintaining the voltage. After the discharge, the open circuit voltage (OCV) was measured after a pause for 20 minutes. With the OCV as a starting point, a series of charge-pause-voltage measurement cycles was also carried out at OCV: 3.18 V; 3.52 V; 3.86 V; and 4.20 V, the cumulative charging capacity was calculated from each charging capacity, and the state of charge (SOC) was calculated in accordance with the following formula.

SOC=(Cumulative Charging Capacity to Each Voltage)/(Cumulative Charging Capacity to 4.2 V)

Furthermore, the OCVs at the five points were plotted with respect to the SOCs to obtain a SOC-OCV approximate curve, and the OCV at the SOC of 50% was specified from the approximate curve.

(Measurement of Direct-Current Resistance)

After leaving for 4 hours at a temperature of −20° C., constant-current charge was carried out with a current value of 1 C up to the OCV at the SOC of 50% at the temperature of −20° C. Then, constant-voltage charge was carried out by reducing the charging current down to a current value of 0.05 C. Then, pulse charge and discharge were carried out for 10 seconds with each current value of 0.6 A, 3 A, 9 A, 15 A, and 30 A. The voltage values after the pulse charge and discharge for 10 seconds with each current value were plotted with respect to the current values to obtain a current-voltage approximate line, and the slope thereof was regarded as the direct-current resistance (DCR). It is to be noted that a pause for 10 minutes was provided between the charge and the discharge.

Example 2

A non-aqueous electrolyte secondary battery 100 according to Example 2 was prepared in the same manner as in Example 1, except that 1 part by weight of lithium difluorobis(oxalato)phosphate and 0.5 parts by weight of fluoroethylenecarbonate were added with respect to 100 parts by weight of the non-aqueous electrolyte solution. The OCV and the DCR were obtained in the same manner as in Example 1.

Example 3

A non-aqueous electrolyte secondary battery 100 according to Example 3 was prepared in the same manner as in Example 1, except that 0.5 parts by weight of lithium difluorobis(oxalato)phosphate and 1 part by weight of fluoroethylenecarbonate were added with respect to 100 parts by weight of the non-aqueous electrolyte solution. The OCV and the DCR were obtained in the same manner as in Example 1.

Example 4

A non-aqueous electrolyte secondary battery 100 according to Example 4 was prepared in the same manner as in Example 1, except that 1 part by weight of lithium difluorobis(oxalato)phosphate and 1 part by weight of fluoroethylenecarbonate were added with respect to 100 parts by weight of the non-aqueous electrolyte solution. The OCV and the DCR were obtained in the same manner as in Example 1.

Comparative Example 1

A non-aqueous electrolyte secondary battery 100 according to Comparative Example 1 was prepared in the same manner as in Example 1, except that no lithium difluorobis(oxalato)phosphate was added while 0.5 parts by weight of fluoroethylenecarbonate was added with respect to 100 parts by weight of the non-aqueous electrolyte solution. The OCV and the DCR were obtained in the same manner as in Example 1.

Comparative Example 2

A non-aqueous electrolyte secondary battery 100 according to Comparative Example 2 was prepared in the same manner as in Example 1, except that no lithium difluorobis(oxalato)phosphate was added while 1 part by weight of fluoroethylenecarbonate was added with respect to 100 parts by weight of the non-aqueous electrolyte solution. The OCV and the DCR were obtained in the same manner as in Example 1.

Comparative Example 3

A non-aqueous electrolyte secondary battery 100 according to Comparative Example 3 was prepared in the same manner as in Example 1, except that 0.5 parts by weight of lithium difluorobis(oxalato)phosphate was added with respect to 100 parts by weight of the non-aqueous electrolyte solution while no fluoroethylenecarbonate was added. The OCV and the DCR were obtained in the same manner as in Example 1.

Comparative Example 4

A non-aqueous electrolyte secondary battery 100 according to Comparative Example 4 was prepared in the same manner as in Example 1, except that neither lithium difluorobis(oxalato)phosphate nor fluoroethylenecarbonate was added. The OCV and the DCR were obtained in the same manner as in Example 1.

Table 1 shows the OCVs and DCRs obtained in the manner described above.

TABLE 1

| Sample number | Lithium difluorobis (oxalato) phosphate [Parts by weight] | Fluoroethylene carbonate [Parts by weight] | Direct-current resistance (DCR) during charge at −20° C. [mΩ] | Open-circuit voltage (OCV) [V] |
|---|---|---|---|---|
| Example 1 | 0.5 | 0.5 | 57.3 | 3.546 |
| Example 2 | 1 | 0.5 | 57.9 | 3.546 |
| Example 3 | 0.5 | 1 | 54.8 | 3.549 |
| Example 4 | 1 | 1 | 55.7 | 3.550 |
| Comparative Example 1 | 0 | 0.5 | 77.2 | 3.547 |
| Comparative Example 2 | 0 | 1 | 74.5 | 3.546 |
| Comparative Example 3 | 0.5 | 0 | 74.4 | 3.551 |
| Comparative Example 4 | 0 | 0 | 85.7 | 3.552 |

As shown in Table 1, it is found that the non-aqueous electrolyte secondary batteries 100 according to Examples 1 to 4 exhibited lower DCRs at the low temperature of −20° C., as compared with the non-aqueous electrolyte secondary batteries according to Comparative Examples 1 to 4. From the foregoing, it is found that in Examples of the present invention, input/output characteristics of the non-aqueous electrolyte secondary batteries can be improved at low temperatures. Further, it was confirmed that the wettability of the non-aqueous electrolyte solutions with respect to the surfaces of the electrodes is improved in the non-aqueous electrolyte secondary batteries 100 according to Examples 1 to 4, as compared with the non-aqueous electrolyte secondary batteries according to Comparative Examples 1 to 4.

The embodiments and Examples disclosed herein are all considered to be illustrative in all respects, and are not restrictive. The scope of the present invention is defined by the claims, but not the embodiments and Examples described above, and intended to encompass all alterations and modifications in the meaning equivalent to the claims and within the scope thereof.

A non-aqueous electrolyte secondary battery can be provided which is capable of improving input/output characteristics at low temperatures.

DESCRIPTION OF REFERENCE SYMBOLS

100: non-aqueous electrolyte secondary battery, 10: battery element, 11: positive electrode member, 12: negative electrode member, 13: separator, 20: outer packaging material

The invention claimed is:
1. A non-aqueous electrolyte secondary battery comprising:
 a positive electrode;
 a negative electrode containing graphitizable carbon; and
 a non-aqueous electrolyte solution comprising an electrolyte salt dissolved in a non-aqueous solvent and additives of fluoroethylenecarbonate and lithium difluorobis(oxalato)phosphate, the non-aqueous electrolyte solution containing, with respect to 100 parts by weight of the non-aqueous electrolyte solution, the fluoroethylenecarbonate at 0.5 parts by weight or more and 1.0 parts by weight or less, and the lithium difluorobis(oxalato)phosphate at 0.5 parts by weight or more and 1.0 parts by weight or less.
2. The non-aqueous electrolyte secondary battery according to claim 1, wherein the non-aqueous solvent is selected from the group consisting of one or more of dimethyl carbonate, ethylmethyl carbonate, diethyl carbonate, ethylene carbonate and propylene carbonate.
3. The non-aqueous electrolyte secondary battery according to claim 1, wherein the electrolyte salt is selected from the group consisting of one or more of $LiPF_6$, $LiAsF_6$, $LiBF_4$, $LiClO_4$, $LiCF_3SO_3$, $LiC(SO_2CF_3)_3$, $LiN(SO_2C_2F_5)_2$, $LiN(SO_2CF_3)_2$, $LiAlCl_4$ and $LiSiF_6$.

4. The non-aqueous electrolyte secondary battery according to claim 3, wherein the electrolyte salt is dissolved at a concentration of 0.1 mol/L to 3.0 mol/L in the non-aqueous solvent.

5. The non-aqueous electrolyte secondary battery according to claim 3, wherein the electrolyte salt is dissolved at a concentration of 0.5 mol/L to 2.0 mol/L in the non-aqueous solvent.

6. The non-aqueous electrolyte secondary battery according to claim 1, wherein the positive electrode and negative electrode are alternately stacked and arranged with a separator interposed therebetween.

7. A non-aqueous electrolyte secondary battery comprising:
    a positive electrode;
    a negative electrode containing graphitizable carbon; and
    a non-aqueous electrolyte solution comprising an electrolyte salt dissolved in a non-aqueous solvent and additives of fluoroethylenecarbonate and lithium difluorobis(oxalato)phosphate, the non-aqueous electrolyte solution containing, with respect to 100 parts by weight of the non-aqueous electrolyte solution, the fluoroethylenecarbonate and the lithium difluorobis(oxalato)phosphate at 0.5 parts by weight or more and 2.0 parts by weight or less in total.

8. The non-aqueous electrolyte secondary battery according to claim 6, wherein the non-aqueous solvent is selected from the group consisting of one or more of dimethyl carbonate, ethylmethyl carbonate, diethyl carbonate, ethylene carbonate and propylene carbonate.

9. The non-aqueous electrolyte secondary battery according to claim 6, wherein the electrolyte salt is selected from the group consisting of one or more of $LiPF_6$, $LiAsF_6$, $LiBF_4$, $LiClO_4$, $LiCF_3SO_3$, $LiC(SO_2CF_3)_3$, $LiN(SO_2C_2F_5)_2$, $LiN(SO_2CF_3)_2$, $LiAlCl_4$ and $LiSiF_6$.

10. The non-aqueous electrolyte secondary battery according to claim 9, wherein the electrolyte salt is dissolved at a concentration of 0.1 mol/L to 3.0 mol/L in the non-aqueous solvent.

11. The non-aqueous electrolyte secondary battery according to claim 9, wherein the electrolyte salt is dissolved at a concentration of 0.5 mol/L to 2.0 mol/L in the non-aqueous solvent.

12. The non-aqueous electrolyte secondary battery according to claim 7, wherein the positive electrode and negative electrode are alternately stacked and arranged with a separator interposed therebetween.

13. The non-aqueous electrolyte secondary battery according to claim 6, wherein:
    the non-aqueous solvent is selected from the group consisting of one or more of dimethyl carbonate, ethylmethyl carbonate, diethyl carbonate, ethylene carbonate and propylene carbonate,
    the electrolyte salt is selected from the group consisting of one or more of $LiPF_6$, $LiAsF_6$, $LiBF_4$, $LiClO_4$, $LiCF_3SO_3$, $LiC(SO_2CF_3)_3$, $LiN(SO_2C_2F_5)_2$, $LiN(SO_2CF_3)_2$, $LiAlCl_4$ and $LiSiF_6$, and
    the electrolyte salt is dissolved at a concentration of 0.1 mol/L to 3.0 mol/L in the non-aqueous solvent.

14. The non-aqueous electrolyte secondary battery according to claim 6, wherein:
    the non-aqueous solvent is selected from the group consisting of one or more of dimethyl carbonate, ethylmethyl carbonate, diethyl carbonate, ethylene carbonate and propylene carbonate,
    the electrolyte salt is selected from the group consisting of one or more of $LiPF_6$, $LiAsF_6$, $LiBF_4$, $LiClO_4$, $LiCF_3SO_3$, $LiC(SO_2CF_3)_3$, $LiN(SO_2C_2F_5)_2$, $LiN(SO_2CF_3)_2$, $LiAlCl_4$ and $LiSiF_6$, and
    the electrolyte salt is dissolved at a concentration of 0.5 mol/L to 2.0 mol/L in the non-aqueous solvent.

15. The non-aqueous electrolyte secondary battery according to claim 6, wherein the electrolyte salt is dissolved at a concentration of 0.1 mol/L to 3.0 mol/L in the non-aqueous solvent.

16. The non-aqueous electrolyte secondary battery according to claim 6, wherein the electrolyte salt is dissolved at a concentration of 0.5 mol/L to 2.0 mol/L in the non-aqueous solvent.

17. The non-aqueous electrolyte secondary battery according to claim 1, wherein:
    the non-aqueous solvent is selected from the group consisting of one or more of dimethyl carbonate, ethylmethyl carbonate, diethyl carbonate, ethylene carbonate and propylene carbonate,
    the electrolyte salt is selected from the group consisting of one or more of $LiPF_6$, $LiAsF_6$, $LiBF_4$, $LiClO_4$, $LiCF_3SO_3$, $LiC(SO_2CF_3)_3$, $LiN(SO_2C_2F_5)_2$, $LiN(SO_2CF_3)_2$, $LiAlCl_4$ and $LiSiF_6$, and
    the electrolyte salt is dissolved at a concentration of 0.1 mol/L to 3.0 mol/L in the non-aqueous solvent.

18. The non-aqueous electrolyte secondary battery according to claim 1, wherein:
    the non-aqueous solvent is selected from the group consisting of one or more of dimethyl carbonate, ethylmethyl carbonate, diethyl carbonate, ethylene carbonate and propylene carbonate,
    the electrolyte salt is selected from the group consisting of one or more of $LiPF_6$, $LiAsF_6$, $LiBF_4$, $LiClO_4$, $LiCF_3SO_3$, $LiC(SO_2CF_3)_3$, $LiN(SO_2C_2F_5)_2$, $LiN(SO_2CF_3)_2$, $LiAlCl_4$ and $LiSiF_6$, and
    the electrolyte salt is dissolved at a concentration of 0.5 mol/L to 2.0 mol/L in the non-aqueous solvent.

19. The non-aqueous electrolyte secondary battery according to claim 1, wherein the electrolyte salt is dissolved at a concentration of 0.1 mol/L to 3.0 mol/L in the non-aqueous solvent.

20. The non-aqueous electrolyte secondary battery according to claim 1, wherein the electrolyte salt is dissolved at a concentration of 0.5 mol/L to 2.0 mol/L in the non-aqueous solvent.

* * * * *